United States Patent
Karchevsky et al.

(10) Patent No.: US 6,329,059 B1
(45) Date of Patent: Dec. 11, 2001

(54) POLYMERIC COMPOSITION HAVING SELF-EXTINGUISHING PROPERTIES

(75) Inventors: Valeria Karchevsky, Bat-Yam; Oleg Figovsky, Haifa; Freddy Romm, Migdal Emek; Leonid Shapovalov, Haifa, all of (IL)

(73) Assignee: Amsil Ltd., Migdal Haemek (IL)

( * ) Notice: Subject to any disclaimer, the term of this patent is extended or adjusted under 35 U.S.C. 154(b) by 0 days.

(21) Appl. No.: 09/438,542

(22) Filed: Nov. 12, 1999

(51) Int. Cl.$^7$ ...................................... B32B 27/38
(52) U.S. Cl. .................. 428/414; 428/474.4; 428/446; 252/609; 156/326; 156/330
(58) Field of Search ................. 428/414, 474.4, 428/446; 252/609; 156/326, 330

(56) References Cited

U.S. PATENT DOCUMENTS 4,692,272 * 9/1987 Goswami ............................. 252/514

OTHER PUBLICATIONS

Danilov et al., The State of Silica in Concentrated Low–Alkalinity Solutions of Tetrabutylammonium Silicates, Journal of Applied Chemistry of the USSR, UDC 666.968, p. 1421.

Standard Test Method for Fatigue Properties of Adhesives in Shear by Tension Loading (Metal/Metal)[1]. Designation: D 3166–93, pp. 209–211.

Korneev et al., Liquid and Soluble Glass, Stroyisdat, 1996, pp. 84–85.

* cited by examiner

*Primary Examiner*—Leszek Kiliman
(74) *Attorney, Agent, or Firm*—Blank Rome Comisky & McCauley LLP

(57) ABSTRACT

A polymeric composition having self-extinguishing properties is disclosed which is useful as both an adhesive or coating. The composition contains 9–45 weight percent of an organic polymeric component and 16–50 weight percent of quaternary ammonium silicate as a fire-retarding component. Fillers and hardening agents may also be a part of the self-extinguishing polymeric composition.

10 Claims, No Drawings

POLYMERIC COMPOSITION HAVING SELF-EXTINGUISHING PROPERTIES

FIELD OF THE INVENTION

The proposed invention refers to fire-resistant materials, more particularly to a polymeric composition which can be used as self-extinguishing adhesive or coating. The present invention refers also to a polymeric composition, which can be advantageously used in preparation of such self-extinguishing adhesives and coatings, and also to various articles of manufacture glued or coated by such self-extinguishing adhesives or coatings.

BACKGROUND OF THE INVENTION

It is widely known that epoxy-based organic compounds are excellent and cheap adhesives. Unfortunately they are extremely flammable.

There exists a method of decrease of flammability of epoxy-based adhesives as disclosed in U.S Pat. No. 4,692, 272 "Thermally stable adhesive comprising soluble polyimide resin and epoxy resin". The known method uses adding to epoxy resins of fire-resistant components, e.g., polyimides.

The drawback of the known method is associated with difficulties of application of the mixed epoxy-polyimide adhesive composition to moist substrates. Besides the adhesive power of such mixture to hydrophobic surfaces decreases and relatively high temperatures (100–400 degrees C.) are required for hardening. It is worth to mention that polyimides are very expensive materials as compared to epoxy based adhesives. It can be readily appreciated that adhesive efficiency of the above mentioned adhesives is insufficient, while their cost is high.

SUMMARY OF THE INVENTION

The proposed invention is based on the idea of combination of an organic polymeric component (e.g,. epoxy or other resin) with a flame-retardant component. In accordance with the invention it is important that such a composition is a homogeneous mixture which does not exhibit sedimentation or stratification. It has been unexpectedly revealed that it is possible to prepare such a composition by mixing of non polar or polar but non dissociating organic component with quaternary ammonium silicate which functions as efficient flame retardant component.

By virtue of this particular flame-retardant component the composition contains relatively high amount of non-flammable silica which efficiently decreases flammability. At the same time the organic polymeric component determines good adhesive properties of the mixture. As a whole the flammability of such a composition is significantly improved, without however deterioration of its adhesive properties.

It should be pointed out that the composition in accordance with the invention can be used not solely as an adhesive for gluing of various substrates but also as a coating which can be reliably and easy applicable to those substrates.

It should be also appreciated that the composition of the invention may contain some other additives that impart specific properties to adhesive or coating. Among such additives can be mentioned fillers, pigments, surfactants, cross-linking agents, polymerization initiators, etc.

It is possible to use in the composition of the invention standard commercially available inorganic fillers, e.g. Aerosil, calcium carbonatc, magnesium carbonate, urea and talc. As suitable pigment one can use titanium dioxide, iron oxide, chromium oxide, etc.

In order to exhibit adhesive properties the composition should also contain a hardening agent. In accordance with the invention this hardening agent should be either non-polar or polar but not dissociating compound. In particular if the composition contains an epoxy resin as an adhesive component then it is advantageous to use as hardening agent an organic compound, which is chosen from the family of aliphatic amines, for example di-ethylene-tetra-amines. In particular one can use sim-tetra-amine-(n-butane).

In accordance with the invention it is commendable to use quaternary ammonium silicates which are compatible with the involved organic adhesive component in terms of their capability to form a homogeneous mixture with the organic component.

It has been empirically found that if the adhesive component is an epoxy-diane resin produced by condensation of epychlorhydryne with diphenylol-propane in alkali medium, then it is very advantageous in terms of compatibility to employ a quaternary ammonium silicate containing at least one radical having four corbon atoms.

It is also commendable in terms of efficiency of flame retardation to use quaternary ammonium silicates with maximal content of silica in the molecule. The amount of silica will be defined further as so called silicate modulus which is the ratio between the total amount of silica in the molecule of quaternary ammonium silicate (presenting both as $[SiO_3]^{2-}$ and as $SiO_2$) to the content of ammonium in the molecule of the quaternary ammonium silicate. It has been found that silicate modulus of at least 4.5 is very favorable for obtaining self-extinguishing properties and at the same time does not deteriorate the compatibility with the adhesive component.

DETAILED DESCRIPTION OF THE PREFERRED EMBODIMENTS

With reference to non-limiting examples presented below the invention will be described now in more details. The mechanical, fire retardation and life time properties of the compositions of the invention were evaluated in accordance with the following ASTM standards: C800-94, C882-91, D897-95, D950-94, D1360-90a, E119-95a.

EXAMPLE 1

Aqueous, alcohol or aqueous/alcohol saturated solution of tetrabutylammonium silicate is prepared for example as described in the monogragh "Liquid and soluble glass" by V. I. Korneev and V. V. Danilov, Stroyisdat, 1996, pp.84,85.

The ready to use tetrabutylammonium silicate will be referred-to further as TBS 20 mass % of epoxy-diane resin, product DER-337 manufactured by DOW CHEMICAL Co. USA is mixed with 40 mas. % of 40% aqueous solution of TBS to obtain homogeneous liquid composition having viscosity of not more than 60 sec (measured by Ford viscosity cup in accordance with ASTM D 1200-94).

To this binary composition is added 10 mass % of hardening agent, namely Ancaminc. manufactured by DOW CHEMICALS. This agent will be referred-to further as AnAm. The rest of the composition contains fillers (talc. magnesium carbonate) and pigments (iron oxide (III)). The ready for use adhesive composition prepared s described above will be referred-to further as Ep1/TBS/AnAm.

The prepared composition was used as an adhesive for gluing metallic, wooden or ceramic substrates and as a coating for applying on these substrates.

For testing this adhesive composition, the glued samples of aluminium-aluminium, iron-iron and wood-wood were prepared. The adhesive properties were tested on the tension-loading machine. The fire retardation (inflammation and self-extinguishing) were studied by direct contact of a coated sample with the fire of a burner at identical conditions for inflammation. The lifetime of the composition at room temperature was estimated by observation of visual changes. Adhesive properties are summarized in non-limiting table 1 below.

EXAMPLE 2

The same as Example 1, but instead of DER-337 it was used aliphatic epoxy resin product K-115 manufactured by "Plastpolymer" (Russia). The ready for use adhesive composition prepared as described above will be referred-to further as Ep2/TBS/AnAm. The adhesive properties were inferior in comparison with Example 1 but still fair.

EXAMPLE 3

72 weight % of 40% aqueous solution of TBS was mixed with 28 weight % of silica-organic resin, namely product 808 manufactured by DOW CORNING CORP. This resin will be referred-to further as SIO. The other conditions were as in Example 1. The ready for use adhesive composition prepared as described above will be referred-to further as SIO/TBS/AnAm. It was found that adhesive properties of this composition are much weaker.

EXAMPLE 4

The same as Example 1 but the weight percentage of components was:

7% of Ep1. 80% of TBS and 3% of AnAm. The ready for use adhesive composition prepared as described above will be referred-to further as Ep1/TBS/AnAm. It was found that the adhesion properties of this composition are much weaker than in Example 1.

EXAMPLE 5

The same as Example 1 but the weight percentage of components was:

36% Ep1. 40% TBS, 18% AnAm. All other conditions were the same as in Example 1. The ready for use adhesive composition prepared as described above will be referred-to further as Ep1/TBS/AnAm. It was found that adhesive properties of this composition are excellent but its fire-resistance decreased.

EXAMPLE 6

The same as in Example 1 but weight percentage of the components was:

6% of Ep1. 50% of TBS, 3% of AnAm, the rest fillers and pigments. All other conditions were as in Example 1. The ready for use adhesive composition prepared as described above will be referred-to further as Ep1/TBS/AnAm. It was found that the properties are very good although adhesion decreased a little.

EXAMPLE 7

The same as Example 1 but weight percentage of the components was: 32% of Ep1. 40% of TBS, 165 of AnAm, the rest—fillers and pigments. All other conditions were as in Example 1. The ready for use adhesive composition prepared as described above will be referred-to further as Ep1TBS/AnAm. It was found that the properties are very good although fire resistance decreased a little.

EXAMPLE 8

The same as Example 1 but silicate modulus of TBS was 4.5. All other conditions were as in Example 1. The ready for use adhesive composition prepared as described above will be referred-to further as Ep1/TBS/AnAm. It was found that the adhesion properties are excellent although fire resistance decreased.

EXAMPLE 9

The same as Example 1 but a silicate modulus of TBS was 5.5. All other conditions were as in Example 1. The ready for use adhesive composition prepared as described above will be refused-to further as Ep1/TBS/AnAm. It was found that the adhesion properties are excellent although fire resistance decreased a little.

EXAMPLE 10

The same as Example 1 but silicate modulus of TBS ws 9.5. All other conditions were as in Example 1. The ready for use adhesive composition prepared as described above will be referred-to further as Ep1/TBS/AnAm. It was found that the fire resistance properties are excellent although adhesive properties decreased a little.

EXAMPLE 11

The same as Example 1 but silicate modulus of TBS was 10.5. All other conditions were as in Example 1. The ready for use adhesive composition prepared as described above will be referred-to further as Ep1/TBS/AnAm. It was found that the fire resistance properties are excellent although adhesive properties decreased.

EXAMPLE 12

The same as Example 1 but instead of TBS it was used tetra-propyl-ammonium silicate which will be referred-to further as TPrS. All other conditions were as in Example 1. The ready for use adhesive composition prepared as described above will be referred-to further as Ep1/TPrS/AnAm. It was found that the fire resistance properties are excellent although adhesive properties decreased.

EXAMPLE 13

The same as Example 1 but instead of TBS it was used tetra-pentyl-ammonium silicate which will be referred-to further as TPeS. All other conditions were as in Example 1. The ready for use adhesive composition prepared as described above will be referred-to further as Ep1/TPeS/AnAm. It was found that the properties are very good.

EXAMPLE 14

70% weight % of Ep1 was mixed with 30 weight % of AnAm. The ready for use adhesive composition prepared as described above will be referred-to further as Ep1/AnAm. It was found that adhesive properties are excellent however there is no fire-resistance.

EXAMPLE 15

70 weight % of Ep2 was mixed with 30 weight % of AnAm. The ready for use adhesive composition prepared as described above will be referred-to further as Ep2/AnAm. It was found that adhesive properties are excellent but there is no fire-resistance.

EXAMPLE 16

SIO without other additives and agents was used as adhesive composition which will be referred-to further as SIO. It was found that adhesion is very weak.

EXAMPLE 17

For comparison of the present invention with existing adhesive compositions we used Polyimide (Cycom 3002) manufactured by AMERICAN CYANAMID without other agents. This ready for use adhesive composition will be referred-to further as Polyimide. It was found that adhesion to metals is excellent, fire resistance is very good however adhesion to wood is very weak.

EXAMPLE 18

The same as Example 1 but instead of AnAm it was used polyamino-functional olygomer, namely product silane mixture Mischung 4 manufactured by DEGUSSA. This hardener will be referred-to further as Pos. All other conditions were as in Example 1. The ready for use adhesive composition prepared as described above will be referred-to further as Ep1/TBS/Pos. It was found that adhesive and fire-resistance properties of this composition are excellent, even a little better than of the composition described in Example 1.

EXAMPLE 19

The same as Example 1 but weight percentage of components was:

6% of Ep1. 50% of TBS, 3% of AnAm, the rest are fillers and pigments. All other conditions were as in Example 1. The ready for use adhesive composition prepared as described above will be referred-to further as Ep1/TBS/AnAm. It was found that the properties are very good although adhesion decreased a little.

EXAMPLE 20

The same as in Example 18 but weight percentage of the compounds was: 18% of Ep1. 45% of TBS, 27% of Pos. All other conditions were as in Example 18. The ready for use adhesive composition prepared as described above will be referred-to further as Ep1/TBS/Pos. It was found that the properties of this composition are excellent, even a little better than of the composition described in Example 1.

EXAMPLE 21

The same as Example 1 but instead of AnAm it was used amino-phenolic hardener manufactured by DOW CHEMICALS. This hardener will be referred-to further as AmPh. The weight percentage of the components was:

20% of Ep1. 50% of TBS, 3% of AmPh. the rest—fillers and pigments. All other conditions were as in Example 1. The ready for use adhesive composition prepared as described above will be referred-to further as Ep1/TBS/AmPh. It was found that the properties of this composition are excellent.

EXAMPLE 22

The same as in Example 21 but weight percentage of the components was:

20% of Ep1. 50% of TBS, 2% of AmPh, the rest fillers and pigments. All other conditions were as in Example 1. The ready for use adhesive composition prepared as described above will be referred-to further as Ep1/TBS/AmPh. It was found that the adhesive properties of this composition are weaker.

EXAMPLE 23

The same as in Example 18 but weight percentage of the components was:

18% of Ep1. 45% of TBS, 36% of Pos. All other conditions were as in Example 18. The ready for use adhesive composition prepared as described above will be referred-to further as Ep1/TBS/Pos. It was found that the properties of this composition are weaker.

The properties of the compositions prepared in accordance with the above examples are summarized in the non-limiting Table 1 below.

The abbreviations used in the table are

A1 strength against tension loading (in MPa), adhesion to aluminum;

A2—strength against tension loading (in MPa), adhesion to steel;

A3—strength against tension loading (in MPa), adhesion to wood;

B time of fire retardancy under inflammation conditions (in seconds);

C period of time from inflammation up to self-extinguishing (in seconds);

Ep1—epoxy resin. namely epoxy-diane, product DER-317, %;

Ep2—epoxy resin (aliphatic, product K-115), %;

Har hardening agent;

Pos polyamino-functional olygomers, namely silane mixture, product Mischung A. manufactured by Degussa;

AnAm—cyclo-alyphatic amine ancamine, manufactured by DOW CHEMICALS

AmPh—amino-phenole high-efficiency hardener, manufactured by DOW CHEMICALS

SIO—silica-organic resin, product 808, manufactured by DOW CHEMICALS;

m—silicate modulus of quaternary ammonium silicate;

TBS—tetrabutylammonium-silicate (m=7);

TPrS—tetrapropylammonium-silicate (m=7);

TPeS—tetrapentylammonium-silicate (m=7);

Br—means breakage x—means no self-extinguishing

TABLE 1

| | | | Results of tests | | | | |
|---|---|---|---|---|---|---|---|
| N. | Composition | m | A1 | A2 | A3 | B | C |
| 1. | Ep1/TBS/AnAm-2/5/1 | 7 | 9.5 | 9.5 | Br | 30 | 3 |
| 2. | Ep2/TBS/AnAm-2/5/1 | 7 | 6.3 | 6.5 | Br | 40 | 2 |
| 3. | SlO/TBS/AnAm = 2/5/1 | 7 | 3 | 2 | Br | 100 | <1 |
| 4. | Ep1/TBS/AnAm = 2/25/1 | 7 | 3 | 3 | 4 | 100 | 1 |
| 5. | Ep1/TBS/AnAm-9/10/4 | 7 | 10 | 10 | Br | 10 | 50 |
| 6. | Ep1/TBS/AnAm-1/9/1 | 7 | 8.5 | 8.8 | Br | 70 | 1 |
| 7. | Ep1/TBS/AnAm-4/5/2 | 7 | 9.8 | 10 | Br | 15 | 5 |
| 8. | Ep1/TBS/AnAm-2/5/1 | 4.5 | 9.8 | 9.9 | Br | 10 | 40 |
| 9. | Ep1/TBS/AnAm = 2/5/1 | 5.5 | 9.7 | 9.8 | Br | 20 | 5 |
| 10. | Ep1/TBS/AnAm-2/5/1 | 9.5 | 9.0 | 9.2 | Br | 60 | 1 |
| 11. | Ep1/TBS/AnAm-2/5/1 | 10.5 | 4.5 | 4.9 | 4 | 50 | 1 |
| 12. | Ep1/TPrS/AnAm-2/5/1 | 7 | 6 | 6.5 | 4 | 50 | <1 |
| 13. | Ep1/TPeS/AnAm-2/5/1 | 7 | 9.3 | 9.4 | Br | 30 | 2 |
| 14. | Ep1/AnAm = 7/3 | — | 10.2 | 10.3 | Br | <1 | x |
| 15. | Ep1/AnAm-7.3 | — | 6.8 | 7.1 | Br | <1 | x |
| 16. | SlO | — | 3 | 2 | Br | 40 | 2 |
| 17. | Polyimide | — | 9.2 | 10.0 | 2 | 30 | 3 |

TABLE 1-continued

| N. | Composition | m | A1 | A2 | A3 | B | C |
|---|---|---|---|---|---|---|---|
| 18. | Ep1/TBS/Pos = 2/5/1 | 7 | 10.5 | 11.0 | Br | 200 | <1 |
| 19. | Ep1/TBS/AnAm-2/5/0.25 | 7 | 9.5 | 10.0 | Br | 50 | 3 |
| 20. | Ep1/TBS/Pos-2/5/3 | 7 | 10.5 | 11.0 | Br | 200 | <1 |
| 21. | Ep1/TBS/AmPh = 2/5/0.3 | 7 | 10.5 | 11.0 | Br | 70 | 2 |
| 22. | Ep1/TBS/AmPh-2/5/0.2 | 7 | 3.0 | 3.8 | Br | 20 | 8 |
| 23. | Ep1/TBS/Pos-2/5/4 | 7 | 5.0 | 6.0 | Br | 50 | 3 |

Results of tests

It is obvious from the data presented in Table 1 that:
1) all considered compositions containing quaternary ammonium silicate (QAS) have improved self-extinguishing properties comparing to the same composition without QAS (compare examples 1–13 to 14–15);
2) adhesion properties in terms of adhesion to metals or wood in combination with inflammation resistance are best for adhesive compositions with QAS (compare examples 1–13 to 14–17);
3) amoung all considered adhesive compositions containing QAS, the best adhesive properties were exhibited by those containing epoxy resins (compare examples 1, 2, 4–13 to 3);
4) among all considered adhesive compositions containing QAS and epoxy resins, the best adhesive properties were exhibited by those containing epoxy-diane resins (compare examples 1, 4–13 to 2);
5) among all considered adhesive adhesive compositions containing QAS and epoxy-diane resin, the best adhesive properties were exhibited by those containing from 10 to 80 weight % of epoxy resins per mass unit QAS (compare examples 1, 6–13 to 4,5);
6) among all considered adhesive compositions containing QAS and 10–80 weight % epoxy-diane resin per mass unit of QAS, the best adhesive properties were exhibited by those containing from 40 to 50 weight % of epoxy resins per unit of QAS (compare examples 1 to 7);
7) among all considered adhesive compositions containing QAS and epoxy-diane resin, the best adhesive properties were exhibited by those having QAS with silicate modulus of at least 5 (compare examples 1, 9, 10, 11 to 8), the best results were obtained for silicate modulus from 5 to 10 (compare examples 1, 9, 10 to 8, 11);
8) among all considered adhesive compositions containing QAS and epoxy-diane resin, the best adhesive properties were exhibited by those in which the QAS has radicals with at least four atoms of carbon (compare examples 1, 13 to 12);

It should be appreciated that the present invention is not limited by the above-described embodiments and that changes and modifications can be made by one ordinarily skilled in the art without deviation from the scope of the invention as will be defined below in the appended claims. It should also be appreciated that features disclosed in the foregoing description, and/or in the following claims, and/or examples, and/or tables may, both separately and in any combination thereof, be material for realizing the present invention in diverse forms thereof.

What is claimed is:

1. A composition for use as an adhesive or a coating, said composition comprising 9–45 weight % of an organic polymeric component and 16–50 weight % of fire-retarding component, wherein said fire retarding component is quaternary ammonium silicate.

2. The composition as defined in claim 1, in which said polymeric component and said fire-retarding component are miscible with formation of homogeneous solution which is resistant to sedimentation and striation.

3. The composition as defined in claim 2, in which said polymeric component is epoxy resin.

4. The composition as defined in claim 3, in which said epoxy resin comprises epoxy-diane resin and said fire-retarding component comprises quaternary ammonium silicate with silicate modulus of at least 4.5.

5. The composition as defined in claim 4, in which the molecule of said quaternary ammonium silicate contains at least one radical with four atoms of carbon.

6. The composition as defined in claim 2, which comprises a hardening agent capable to harden said polymeric component.

7. The composition as defined in claim 6, which comprises 9–35weight % of polymeric component, 16–50 weight % of fire-retarding component and 1–41 weight % of said hardening agent.

8. An article of manufacture having sandwiched structure with at least two layers adhered one to another by an adhesive composition comprising a polymeric component and a fire retarding-component, wherein said fire-retarding component is quaternary ammonium silicate.

9. An article of manufacture having a substrate and a coating adhered thereto by an adhesive composition comprising a polymeric component and a fire-retarding component, wherein said fire-retarding component is quaternary ammonium silicate.

10. The composition as defined in claim 6, which the hardening agent is at least one polyamino-functional olygoner having formula $(NR_4)_2O \times nSIO_7x\ NR(R'R'')—Si(OR'')_3$ where R is an organic radical.

* * * * *